(12) United States Patent
Gunnar

(10) Patent No.: US 9,489,058 B2
(45) Date of Patent: Nov. 8, 2016

(54) COORDINATE DEVICE WITH PRESSING DOWN FUNCTION

(71) Applicant: Drougge Gunnar, Stockholm (SE)

(72) Inventor: Drougge Gunnar, Stockholm (SE)

( * ) Notice: Subject to any disclaimer, the term of this patent is extended or adjusted under 35 U.S.C. 154(b) by 11 days.

(21) Appl. No.: 14/440,364

(22) PCT Filed: Oct. 18, 2013

(86) PCT No.: PCT/SE2013/000158
§ 371 (c)(1),
(2) Date: May 4, 2015

(87) PCT Pub. No.: WO2014/070061
PCT Pub. Date: May 8, 2014

(65) Prior Publication Data
US 2015/0277589 A1    Oct. 1, 2015

(30) Foreign Application Priority Data
Nov. 2, 2012   (SE) .................................... 1200669

(51) Int. Cl.
*G06F 3/0354*   (2013.01)
*G06F 3/0362*   (2013.01)
*G06F 3/0338*   (2013.01)
*H01H 25/00*   (2006.01)
*H01H 25/06*   (2006.01)
*H01H 19/14*   (2006.01)

(52) U.S. Cl.
CPC ......... *G06F 3/03543* (2013.01); *G06F 3/0338* (2013.01); *G06F 3/0354* (2013.01); *G06F 3/0362* (2013.01); *H01H 25/008* (2013.01); *H01H 25/06* (2013.01); *H01H 2019/146* (2013.01)

(58) Field of Classification Search
None
See application file for complete search history.

(56) References Cited

U.S. PATENT DOCUMENTS

| | | | |
|---|---|---|---|
| 2012/0229385 A1* | 9/2012 | Fu .......................... | G06F 3/0346 345/163 |
| 2013/0120264 A1* | 5/2013 | Nien ........................ | G09G 5/08 345/167 |
| 2015/0363014 A1* | 12/2015 | Wang ...................... | G06F 3/016 345/157 |

*Primary Examiner* — Joseph Haley
(74) *Attorney, Agent, or Firm* — Mark M. Friedman

(57) ABSTRACT

The invention refers to a coordinate device (1) which enables manual control of x- and y- coordinates. The coordinate device (1) comprises a rolling cylinder (5) which freely can rotate around a rotation axle, be translated along the rotation axle and be pressed down to generate a pressure signal. The rolling cylinder (5) is carried in an upper support rail (8) and is held in this in bearings which allow the rolling cylinder to rotate. A lower support rail (11) receives the upper support rail (8) and comprises motion detector elements (13) which detect the rotation and translation of the rolling cylinder (5). The control element (5, 8, 11) comprising the rolling cylinder (5) and the upper (8) and lower (11) support rails are mounted to be pressed down from a standby position in a cover (2, 15) and activate a pressing down sensor (17). Since the whole control element then is being pressed down, without the rolling cylinder (5) being raised or lowered relative to the motion detector element (13) on the lower support rail (11), the pressing down does not affect the measurement values of the motion detector element (13). In one design of the coordinate device (1) the upper support rail (8) comprises feet (9a-d) which allow it to translate in the longitudinal extent of the lower support rail (11) and the lower support rail (11) comprises a recessed track (22) which is intended to receive a first pair of the feet (9c-d) on the upper support rail and allows this to move along the track. In another design of the coordinate device (1) the feet (9a-d) comprise wheels, which enable the translation movement to take place with even less friction.

6 Claims, 4 Drawing Sheets

COORDINATE DEVICE WITH PRESSING DOWN FUNCTION

The present invention refers to a coordinate device with a pressing down function according to the preamble of the independent claim.

In particular it refers to such a coordinate device with a pressing down function equipped with a rolling cylinder.

THE BACKGROUND TO THE INVENTION

Coordinate devices that fulfill a function corresponding to that of a computer mouse, where the user rolls and laterally pushes a rolling cylinder are known. Such coordinate devices comprise sensors that detect the movement of the rolling cylinder, both regarding its rotation and its lateral translation. Typical computer mice comprise push buttons which act by pressing the mouse towards the underlying surface, but if a rolling cylinder is pressed in a corresponding manner this will by the sensor be interpreted as a movement equivalent to a rotation of the rolling cylinder. This causes an undesired disturbance in the detected coordinates, which is unsuitable.

One purpose of the invention is therefore to provide a coordinate device with a pressing down function which solves the problems with known technology when pressing down the coordinate device.

These and other purposes are achieved by a coordinate device with a pressing down function according to the characterizing parts of the independent claim.

SUMMARY OF THE INVENTION

The invention refers to a coordinate device 1 which enables manual control of at least two coordinate parameters, typically one x- and one y-coordinate. The coordinate device 1 comprises a rolling cylinder 5 which freely can rotate around a rotation axle, be translated along the rotation axle and be pressed down to generate a pressure signal. The rolling cylinder 5 is carried in an upper support rail 8 and is held in this in bearings which allow the rolling cylinder to rotate. A lower support rail 11 receives the upper support rail 8 and comprises motion detector elements 13 which detect the rotation and translation of the rolling cylinder 5. The upper support rail 8 is designed to translate in the longitudinal extent of the lower support rail 11. The control element 5, 8, 11 comprising the rolling cylinder 5 and the upper 8 and lower 11 support rails is mounted to be pressed down from a standby position in a cover 2, 15 and activate a pressing down sensor 17. Since the whole control element then is pressed down, without the rolling cylinder 5 being raised or lowered relative to the motion detector element 13 on the lower support rail 11, the pressing down does favorably not affect the measurement values of the motion detector element 13.

In one design of the coordinate device 1 according to claim 1, the upper support rail (8) comprises feet (9a-d) which allow it to translate in the longitudinal extent of the lower support rail (11) and the lower support rail 11 comprises a recessed track 22 which is intended to receive a first pair of the feet 9c-d on the upper support rail and allows this to move along the track.

In a favorable design of the coordinate device 1 the feet 9a-d comprise wheels, which enable the translation movement to take place with even less friction.

The invention refers thereto such a coordinate device 1 which comprises end position sensors 10, 18a-b for detection of whether the rolling cylinder 5 has reached either end position.

DESCRIPTION OF A PREFERRED DESIGN

The invention refers to a device which here is designated coordinate device and which from a user by hand movements measures and presents coordinate information which for example can control a marker on a computer screen or similar. The coordinate device has uses similar to how for instance a computer mouse is used, but the coordinate device is when used normally still on an underlying surface instead of moving over the underlying surface.

Figure 10:
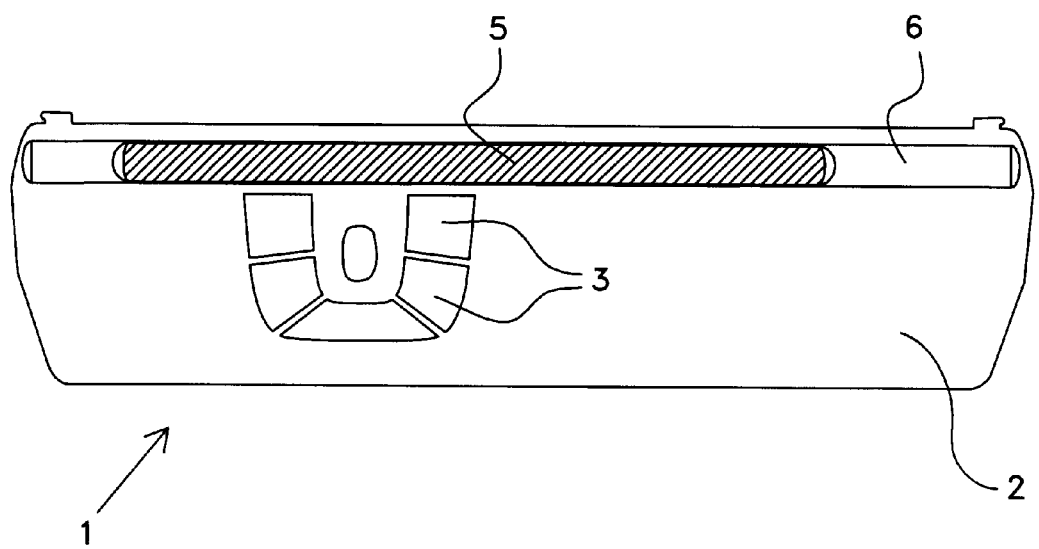
FIG. 10 shows the coordinate device with a cover attached

How the coordinate device 1 looks in a fully assembled mode is shown in FIG. 10. The coordinate device has a rectangular upper surface where a large part along the one long side, which faces the user, provides support 2 for the wrist. Along the other long side, which faces away from the user, there is a rolling cylinder 5 mounted which comprises the main input element of the coordinate device. On one part of the wrist rest a set of keys 3 and a scroll wheel are mounted, which complement the input element of the coordinate device in form of the rolling cylinder.

The rolling cylinder runs in an open track 6 where it freely can be moved in the direction of the rolling cylinder's longitudinal axis to the right or left. The recessed track extends close up to the short sides of the coordinate device and the ends of the track limit the movement of the rolling cylinder. The movement of the rolling cylinder in the longitudinal extent of the track is used by the coordinate device to calculate the one parameter in the coordinate indication, here typically an x-coordinate value.

The rolling cylinder can freely roll around its rotation axle and the user can, by rotating the rolling cylinder, change the other parameter of the coordinate indication, here typically a y-coordinate value. Of course translation and rotation of the rolling cylinder can be used to generate coordinate indications which are used in other ways than to specify x- and y-coordinates in a Cartesian coordinate system. The coordinate indications can of course be used in combination with additional input data, such as input data from the scroll wheel 4, to for instance produce control data with three dimensions.

In connection to the figures below the construction of the coordinate device is described. The description is based on a stepwise assembly of the coordinate device inside out, thus largely in the way it is appropriately assembled in production.

Figure 1:
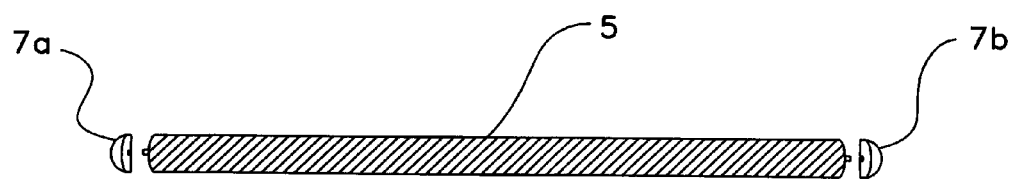
FIG. 1 shows a rolling cylinder with bearings

FIG. 1 shows a rolling cylinder 5 with bearings 7a-b adjacent to both ends of the rolling cylinder. With the bearings removed from the rolling cylinder both the rolling axles of the rolling cylinder which protrude from both ends of the rolling cylinder are illustrated. The diameters of the rolling axles are significantly smaller than the diameter of the rolling cylinder above most of its extent and enables that the rolling cylinder easily rotates around the rolling axles with these inserted into the corresponding holes in the bearings 7a-b. In the proposed design the rolling cylinder thus has plain bearings which give low friction, but one can of course also consider a version with ball-bearings or other types of bearings.

Figure 2:
FIG. 2 shows the rolling cylinder with mounted bearings

FIG. 2 shows the rolling cylinder with bearings 7a-b mounted on the roll axles. The bearing elements 7a-b partly function as bearings but also as fasteners which are pushed down into receiving apertures in an upper support rail and hold the rolling cylinder slightly above the upper support rail so that it can rotate freely.

Figure 3:
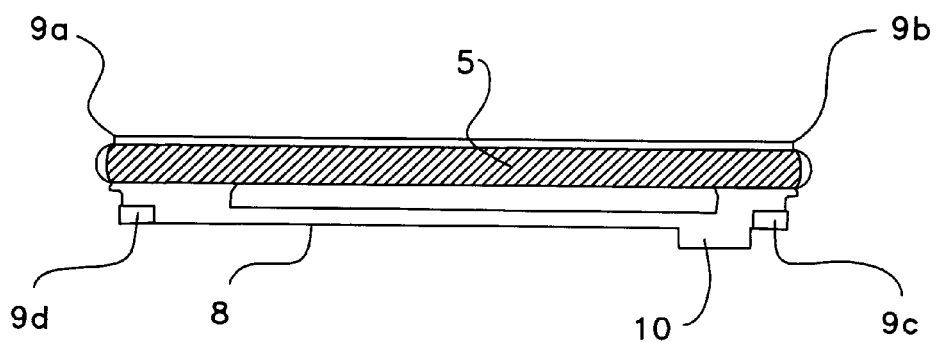
FIG. 3 shows the rolling cylinder mounted on an upper support rail

FIG. 3 shows the rolling cylinder mounted on the upper support rail 8. The upper support rail is mainly rectangular with fastening apertures for receiving the bearing elements at the two short sides of the rail so that the rolling cylinder extends parallel to the longitudinal axis of the rail. In each of the four corners of the upper support rail there are feet 9a-d mounted which enable the rail with the rolling cylinder to move over an underlying surface. In the proposed design the feet consist of protruding elements from the underside of the rail with flat undersides which easily slide on the underlying surface. Obviously the rail can roll even more easily when the feet consist of ball bearings or wheels with ball bearings with the rotation axles parallel to the short sides of the upper support rail.

From the one long side of the upper support rail a stop element 10 protrudes which is used to detect whether the rail has reached either end position in its translation movement.

Figure 4:
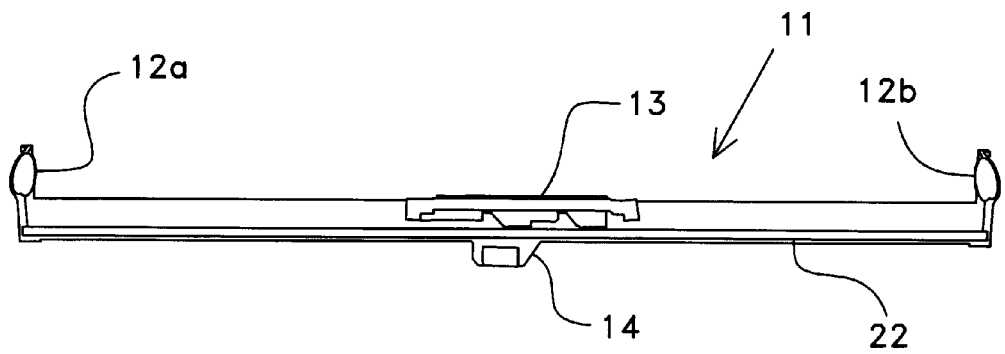
FIG. 4 shows a lower support rail

FIG. 4 shows a lower support rail 11 which consists of a mainly rectangular element with a long side which is of the same length as the length of the coordination device, so that the upper support rail can be received on the shorter lower support rail with space for the lower support rail to be protruded along the lower support rail parallel to its long side.

On both short sides of the lower support rail 11 end parts 12a-b are mounted. Both end parts have inside surfaces facing each other and are formed as part of a spherical surface. Both inside surfaces of the end parts are designed to receive the bearing element of the rolling cylinder which has outside surfaces shaped like part of a sphere. The end parts extend upwards from the top of the lower support rail and outwards from the one long side. Along the same long side on the center of the lower support rail a motion detector element 13 is mounted which is directed towards the position where the rolling cylinder is mounted, thus in the same direction as the end parts extend. Thus the motion detector element 13 has a fixed height above the both rails relative to the rolling cylinder, independent of how the whole control element 5, 8, 11 which comprises the rolling cylinder and both the rails move, which gives a high level of reliability when interpreting the movement of the rolling cylinder.

On the other long side of the lower support rail a pressure element 14 protrudes approximately at the middle of the rail. The pressure element interacts with a pressure sensor, so that then the whole control element 5, 8, 11 which comprises the rolling cylinder and both the rails is pressed down, the pressure element is pressed against the pressure sensor and a signal is generated indicating that the control element is being pressed down. This can be used in the same way as the buttons on a conventional computer mouse.

Along the other long side of the lower support rail extends a recessed track 22 which is intended to receive a pair of the feet 9c-d on the upper support rail and allows this to move along the track. Since the upper support rail with its one pair of feet rests in the track, the upper support rail is always kept at the same height above the lower support rail regardless of how it is raised or pressed down.

Figure 5:
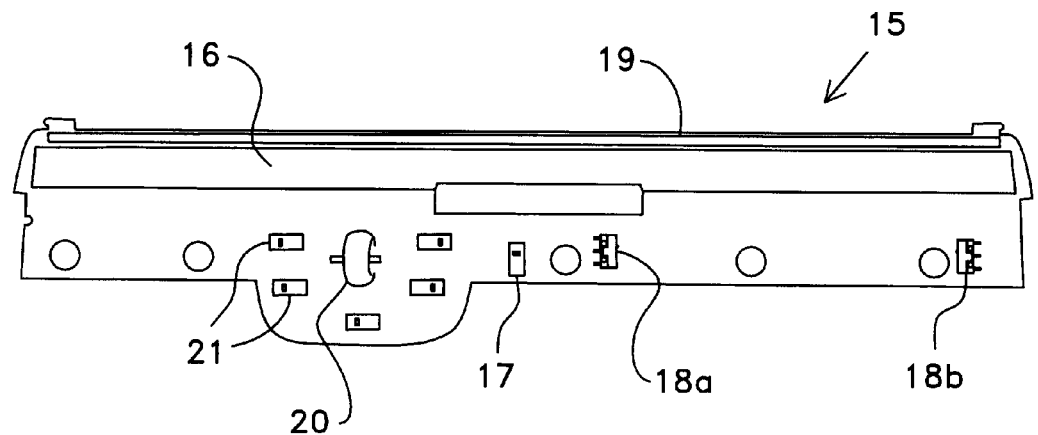
FIG. 5 shows an undercarriage for a coordinate device according to the invention

FIG. 5 shows an undercarriage 15 for a coordinate device according to the invention and this is designed to receive the control element 5, 8, 11. The undercarriage comprises an elongated, approximately rectangular recess 16 which extends along the one long side of the undercarriage and is designed to receive the rolling cylinder. The recess enables the whole control element 5, 8, 11 to move slightly downwards from a standby position. The control element is normally kept in this standby position by an elastic element and when the control element is pressed down, it springs back to the standby position as soon as the pressure has stopped.

The control element rests at two points on the end parts 12a-b of the lower support rail and on the elastic element, so that it freely can be tilted around the axle which extends between both the support points on the end part.

The undercarriage 15 comprises three pressure sensors 17, 18a-b used to detect the movement of the control element. A pressing down sensor 17 is mounted so that it interacts with the pressure element 14 on the lower support rail and detects if the control element is pressed down. Two end position sensors 18a-b are mounted to interact with the stop element 10 on the upper support rail. When the upper support rail moves laterally the stop element 10 reaches either end position sensor 18a-b which generates a signal indicating that the rolling cylinder has reached an end position.

Along the one long side of the undercarriage 15, along and immediately adjacent to the recess 16, a slide is mounted which receives a pair of feet 9a-b on the upper support rail and allows it to slide on this with low friction.

The undercarriage 15 in addition comprises a scroll wheel 20 for detection of additional coordinate information and five pressure sensors 21 for additional push buttons.

Figure 6:
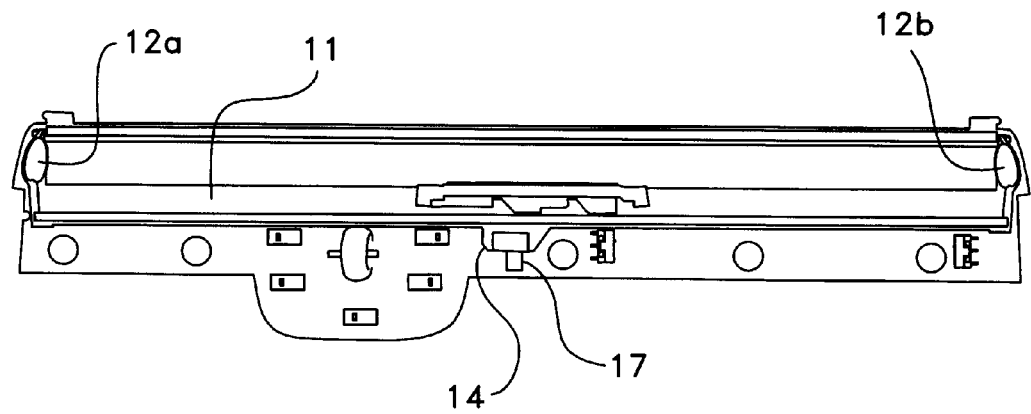
FIG. 6 shows the lower support rail mounted on the undercarriage

FIG. 6 shows the lower support rail mounted on the undercarriage and the figure clearly illustrates how the pressure element 14 on the lower support rail extends above the pressing down sensor 17 on the undercarriage. Further it is illustrated how the end parts 12a-b on the lower support rail 11 are mounted adjacent to the short sides on the recess 16 on the undercarriage.

Figure 7:
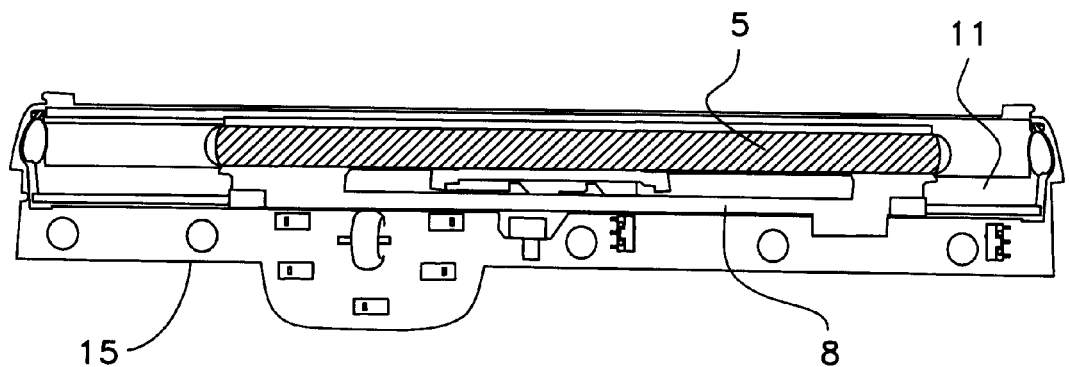
FIG. 7 shows the rolling cylinder on the upper support rail, above the lower support rail on the undercarriage

FIG. 7 shows the control element 5, 8, 11 mounted on the undercarriage 15. The rolling cylinder 5 is in a middle position and can freely be pushed to the right or left. The whole control element can be pressed down so that the pressing down sensor 17 is activated, but without the motion detector element 13 being raised or lowered relative to the rolling cylinder.

Figure 8:
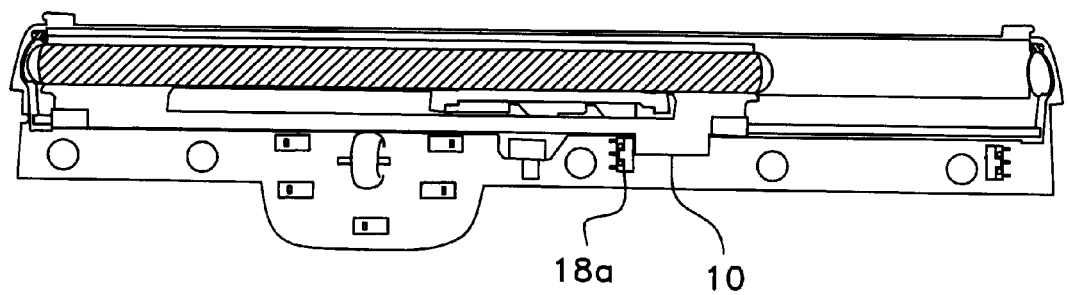
FIG. 8 shows the rolling cylinder in its leftmost position on the coordinate device

FIG. 8 shows the rolling cylinder in its leftmost position on the coordinate device and here the stop element 10 on the upper support rail touches the left end position sensor 18a.

Figure 9:
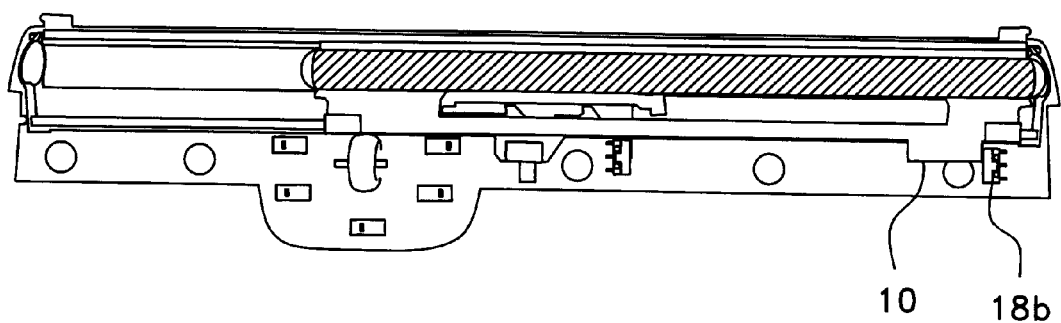
FIG. 9 shows the rolling cylinder in its rightmost position on the coordinate device

FIG. 9 shows the rolling cylinder in its rightmost position on the coordinate device and here the stop element 10 on the upper support rail touches the right end position sensor 18b.

FIG. 10 shows the coordinate device with a cover 2 attached which provides support for the wrist. The cover prevents the control element 5, 8, 11 from falling out of the coordinate device, but still allows the rolling cylinder to slide laterally, rotate around its rotation axle and to be pressed down. The rolling cylinder is reachable through an open track 6 in the cover, but is prevented from falling out through the track by being attached to the upper support rail by the bearings. In the proposed design the coordinate device comprises scroll wheel 4 and additional keys 3, but these are obviously not necessary. The coordinate device neither needs to comprise a wrist rest and can thus be made slimmer. Alternatively the space which in this design comprises a wrist rest can be filled with keys so that the coordinate device comprises a keyboard with associated control element 5, 8, 11.

The invention claimed is:

1. A coordinate device (1) which enables manual control of at east two coordinate
parameters, where the coordinate device (I) comprises a rolling cylinder (5) which freely can rotate around a rotation axle, be translated along the rotation axle and be pressed down to generate a pressure signal characterized by that the rolling cylinder (5) is carried in an upper support rail (8) and is held in this in bearings which allow the rolling cylinder to rotate where a lower support rail (11) receives the upper support rail (8) and comprises motion detector elements (13) which detect the rotation and translation of the rolling cylinder (5), where further the upper support rail (8) is designed to translate in the longitudinal extent of the lower support rail (11), and where the control element (5, 8, 11) comprising the rolling cylinder (5) and the upper (8) and lower (11) support rails are mounted to be pressed down from a standby position in a cover (2, 15) and activate a pressing down sensor (17).

2. A coordinate device (1) according to claim 1 characterized by that the upper support rail (8) comprises feet (9a-d) which allow it to translate in the longitudinal extent of the lower support rail (11) and the lower support rail (11) comprises a recessed track (22) which is intended to receive a first pair of the feet (9c-d) on the upper support rail and allows this to move along the track.

3. A coordinate device (1) according to claim 2, characterized by that the cover (2, 15) comprises a track (19) mounted to receive a second pair of feet (9a-b) on the upper support rail.

4. A coordinate device (1) according to claim 2, characterized by that the feet (9a-d) comprise wheels.

5. A coordinate device (1) according to claim 1, characterized by that the coordinate device (1) comprises end position sensors (10, 18a-b) which detect if the rolling cylinder (5) has reached either of the end positions.

6. A coordinate device (1) according to claim 3, characterized by that feet (9a-d) comprise wheels.

* * * * *

UNITED STATES PATENT AND TRADEMARK OFFICE
CERTIFICATE OF CORRECTION

PATENT NO. : 9,489,058 B2  Page 1 of 1
APPLICATION NO. : 14/440364
DATED : November 8, 2016
INVENTOR(S) : Drougge Gunnar It is certified that error appears in the above-identified patent and that said Letters Patent is hereby corrected as shown below:

In the Claims

Claim 1, Column 5 should be corrected as follows:
Line 19: Change:
--east--
to
"least"

Signed and Sealed this
Twenty-first Day of February, 2017

Michelle K. Lee
*Director of the United States Patent and Trademark Office*